(12) United States Patent
Guenanten et al.

(10) Patent No.: US 8,092,731 B2
(45) Date of Patent: Jan. 10, 2012

(54) METHOD FOR PRODUCING A THERMOPLASTIC PLASTIC FILM, FILM AND USE THEREOF

(75) Inventors: Claude Guenanten, Darmstadt (DE); Christoph Steinfels, Weiterstadt (DE); Herbert Groothues, Weiterstadt (DE); Christoph Krohmer, Moetzingen (DE); Helmut Haering, Reinheim (DE); Detlef Birth, Dieburg (DE); Christopher Neuroth, Gross-Zimmern (DE); Michael Meier-Kaiser, Alsbach-Haehnlein (DE); Walter Meon, Darmstadt (DE)

(73) Assignee: Röhm GmbH, Darmstadt (DE)

( * ) Notice: Subject to any disclaimer, the term of this patent is extended or adjusted under 35 U.S.C. 154(b) by 603 days.

(21) Appl. No.: 11/912,941

(22) PCT Filed: Nov. 24, 2005

(86) PCT No.: PCT/EP2005/012602
§ 371 (c)(1), (2), (4) Date: Oct. 29, 2007

(87) PCT Pub. No.: WO2006/117018
PCT Pub. Date: Nov. 9, 2006

(65) Prior Publication Data
US 2008/0182091 A1 Jul. 31, 2008

(30) Foreign Application Priority Data
Apr. 29, 2005 (DE) .......................... 10 2005 020 424

(51) Int. Cl.
*B32B 37/00* (2006.01)
*B29D 11/00* (2006.01)

(52) U.S. Cl. ................. 264/172.19; 264/1.29; 264/1.34; 264/1.6; 264/1.7; 264/39; 264/40.5; 264/173.1; 264/210.1; 264/211.13; 264/237; 425/133.5; 425/140; 425/145; 425/150; 425/171

(58) Field of Classification Search ........................ None
See application file for complete search history.

(56) References Cited

U.S. PATENT DOCUMENTS
2,083,557 A * 6/1937 Crane et al. ................. 425/172
(Continued)

FOREIGN PATENT DOCUMENTS
DE 90 03 591 8/1990
(Continued)

OTHER PUBLICATIONS
U.S. Appl. No. 12/092,276, filed May 1, 2008, Numrich, et al.
(Continued)

*Primary Examiner* — Jeffrey Wollschlager
(74) *Attorney, Agent, or Firm* — Oblon, Spivak, McClelland, Maier & Neustadt, L.L.P.

(57) ABSTRACT

The invention relates to a method for producing a thermoplastic plastic film. According to said method, the thermoplastic plastic is melted and transported in an extrusion installation comprising an extruder, an extrusion nozzle with a wide-slot delivery opening and a chill roll, which is fixed to a roll system and then leaves the delivery opening of the extrusion nozzle in the form of a flat melted web. Said melted web is then applied to the chill roll and is cooled. The invention is characterised in that it uses an extrusion installation, in which the distance between the delivery opening of the extrusion nozzle and the surface of the cooled roll does not vary by more than +/−50 μm during the operating time. The invention also relates to a film of this type and to uses of the latter.

15 Claims, 3 Drawing Sheets

U.S. PATENT DOCUMENTS

| | | | |
|---|---|---|---|
| 2,364,435 A * | 12/1944 | Foster et al. | 264/210.1 |
| 3,422,494 A * | 1/1969 | Lewis, Jr. et al. | 425/145 |
| 4,693,677 A | 9/1987 | Shigemoto et al. | |
| 5,324,188 A * | 6/1994 | Santoh et al. | 425/363 |
| 5,547,761 A * | 8/1996 | Chapman et al. | 428/422 |
| 5,607,703 A * | 3/1997 | Sakai et al. | 425/145 |
| 6,245,271 B1 * | 6/2001 | Jacobs et al. | 264/154 |
| 6,306,323 B1 * | 10/2001 | Chu et al. | 264/105 |
| 6,472,031 B1 * | 10/2002 | Daecher et al. | 428/1.1 |
| 6,613,264 B1 * | 9/2003 | Numrich et al. | 264/319 |
| 6,814,557 B1 * | 11/2004 | Swanson et al. | 425/140 |
| 7,005,180 B2 | 2/2006 | Numrich et al. | |
| 2002/0114922 A1 | 8/2002 | Bourne et al. | |
| 2003/0031847 A1 * | 2/2003 | Numrich et al. | 428/215 |
| 2005/0164007 A1 | 7/2005 | Numrich et al. | |
| 2007/0099548 A1 * | 5/2007 | Kumar et al. | 451/21 |
| 2007/0123610 A1 | 5/2007 | Schultes et al. | |
| 2007/0197703 A1 | 8/2007 | Neuhauser et al. | |
| 2008/0138610 A1 | 6/2008 | Neuhauser et al. | |

FOREIGN PATENT DOCUMENTS

| | | |
|---|---|---|
| EP | 0 391 193 | 10/1990 |
| EP | 0 547 562 | 3/1997 |
| EP | 1 202 261 | 5/2002 |
| EP | 1 285 742 | 2/2003 |
| EP | 1 422 043 | 5/2004 |
| EP | 1 433 586 | 6/2004 |
| GB | 1 170 640 | 11/1969 |
| JP | 52-15629 | 2/1977 |
| JP | 5-169000 | 7/1993 |
| JP | 2003-131006 | 5/2003 |
| WO | 95 04648 | 2/1995 |

OTHER PUBLICATIONS

U.S. Appl. No. 11/816,130, filed Oct. 9, 2007, Numrich, et al.

U.S. Appl. No. 10/570,194, filed Mar. 2, 2006, Numrich, et al.

* cited by examiner

METHOD FOR PRODUCING A THERMOPLASTIC PLASTIC FILM, FILM AND USE THEREOF

The invention relates to a process for production of a foil composed of thermoplastic, to a foil, and to use of the foil.

BACKGROUND OF THE INVENTION

EP 1 117 731 B1 describes polycarbonate foils which are almost optically isotropic, and also a chill-roll process for their production. The foils are composed of linear or branched polycarbonate whose average molecular weight Mw is from 10,000 to 40,000. Inventive foils can by way of example have shrinkage of <1%/<1% (190° C./30 min machine direction (MD)/transverse direction (TD)). There is preferably no region of the surface of the inventive foil that deflects linearly polarized light by more than 2 angular minutes. By way of example the path difference can be 31 nm, the birefringence delta n $4 \times 10^{-4}$. By way of example, the tensile strain at break measured to ISO 527-3 MD/TD in the tensile test is 39 and, respectively, 35%. To avoid die lines or extrusion streaks it is recommended that the inner surface of the extrusion die used has a roughness depth to DIN 4768 of from 0.025 to 0.002 in the die lip region. This can be achieved via chroming and polishing.

The advantageous properties of the material are in particular said to be achievable by keeping the temperature of the polymer melt at least 30° C. above the glass transition temperature of the plastic after discharge from the extrusion die until contact is made with the chill roll. To this end, the path from discharge from the extrusion die to the point of application to the chill roll can be selected to be relatively short, e.g. in the region of by way of example from 30 to 150 mm. The emerging melt film can moreover be thermally screened by means of a housing or additionally heated. The process is suitable for a wide variety of plastics, in particular for norbornene plastics.

U.S. Pat. No. 5,476,134 describes extruders coated with chromium nitrides for production of parts composed of aluminium-iron alloys. These are particularly suitable for reducing the level of erosion of the extruder parts when producing aluminium alloys with very small proportions of iron below 0.3%.

EP 351 886 (Bayer AG) describes a casting or extrusion process for production of optically uniaxial, birefringent polycarbonate foils, which are heated by means of a quartz radiant heater. The result is a reduction in the undesired birefringence to values that are no longer problematic.

JP 8336883 describes a process for extrusion of foils composed of thermoplastic, where the radius of the edges of the discharge orifice of the extrusion die used is 30 μm or less, with non-uniformity of not more than +/−20%. The die geometry described in particular counters formation of undesired deposits.

JP 6335949 describes a process for extrusion of foils composed of thermoplastic, preferably by way of example polyether sulphones, polyphenylene oxides or polyether ketones, where the radius of the edges of the discharge orifice of the extrusion die used is 30 μm or less, with non-uniformity of not more than +/−20%. The extrusion die can be composed of steel or ceramic. Coatings with chromium, nickel, titanium, copper, zinc, etc. can counteract any possible interactions of the die material with the extruded plastics materials. The die geometry described in particular counteracts formation of die lines.

JP 2002-028941 describes a process for production of foils composed of polyvinyl alcohol, and these can be used as polarization films. Films with reduced thickness variations can be obtained if the radius of the edges of the discharge orifice of the extrusion die used is 200 μm or less.

JP 2003-267758 describes a process for coating of optical fibres with a plastics sheathing. Here, the radius of the edges of the discharge orifice of the extrusion die used is from 10 to 30 μm. The die geometry described in particular counteracts formation of plastics deposit in the region of the edge of the die, so that the process can then be operated over a prolonged production period without disruption. Another advantage is that the plastics coating has lower thickness variations.

EP 0 547 562 A1 describes a process for coating of a sheet-like web which runs around a roll, with a coating solution. Here, the coating solution is applied from a slot die radially, i.e. at an angle of 90° with respect to the roll surface, to the web to be coated. A multilayer web is produced by virtue of the conveying motion of the roll. The steep angle of application achieves a choke effect in relation to the amount of coating solution applied. If the distance between the die and the roll or the corresponding gap between die and roll deviates excessively from the intended situation the result can be impairment of the surface quality of the multilayer web, e.g. lines and streaking. There is therefore a distance measurement system installed on the right- and left-hand side of the coating die, with a control circuit, in order to exert an advantageous influence on the reproducibility and precision of the process. If the distance between the discharge orifice of the coating die and the roll deviates from the intended value, the position of the coating die with respect to the roll is corrected correspondingly by means of an adjuster.

EP 1 202 261 A1 describes optical storage media. The vertical birefringence of commercially available, extruded polycarbonate foils produced by the chill-roll process is compared inter alia with that of commercially available, cast polycarbonate foils. The extruded foils have vertical birefringence values of 0.00029, while the cast foils have values of 0.00066.

BRIEF SUMMARY OF THE INVENTION

A number of application sectors for plastics foils, in particular in the field of optical data carriers, demand not only very small optical birefringence but also increasingly further improvements in the surface quality of the foils. In particular, ever-smaller thickness tolerances are demanded, across large areas or indeed across the entire foil.

EP 1 117 731 B1 and EP 1 285 742 A2 disclose interesting solutions for production of foils with an extremely low level of birefringence properties in the region of a few nanometres, and these comply with stringent requirements in the optical sector. In relation to surface properties, according to the teaching of EP 1 117 731 B1 it is possible to produce foils where there is no region of the surface that deflects linearly polarized light by more than 2 angular minutes. According to EP 1 285 742 A2, it is possible to achieve thickness tolerances in the region of about 2.4 μm per 2 cm of width.

An object was to provide a foil which is composed of plastic and which firstly has extremely good birefringence properties in the region of EP 1 117 731 B1 or of EP 1 285 742 A2 and secondly again achieves improved surface quality. The foil should moreover again exhibit relatively low thickness tolerances across the entire region of the foil. The improved surface quality and thickness tolerances are in particular intended to comply with stringent requirements for optical data carriers and are therefore intended to be based on a specification within a circular area whose diameter is 12 cm.

The object is achieved via a process for production of a foil composed of thermoplastic, where the thermoplastic is melted in an extrusion system, comprising an extruder, an extrusion die with a discharge orifice in the form of a slot, and a cooled roll (chill roll) secured to a roll frame, and is conveyed onward, and emerges in the form of a sheet-like melt web from the discharge orifice of the extrusion die, and the melt web is applied to the cooled roll (chill roll) and is cooled, characterized in that the distance between the discharge orifice of the extrusion die and the surface of the cooled roll (chill roll) in the extrusion system used varies by not more than +/−50 μm as a function of time in the operating condition.

According to the inventive process, a foil composed of a thermoplastic with a thickness of from 10 to 150 μm and with an in-plane birefringence which causes an optical path difference of at most 15 nm when radiation passes through the material perpendicularly, and also with vertical birefringence of at most 0.0004, can be produced or obtained, and is characterized in that there is no region of the surface of the foil that deflects perpendicularly incident light by more than 0.8 angular minutes, and the thickness tolerance of the foil, based on a circular area whose diameter is 12 cm, is not more than +/−1%.

BRIEF DESCRIPTION OF THE DRAWINGS

The invention is explained in more detail via the figures below, but there is no intention that it be restricted to these embodiments.

Figure 1:
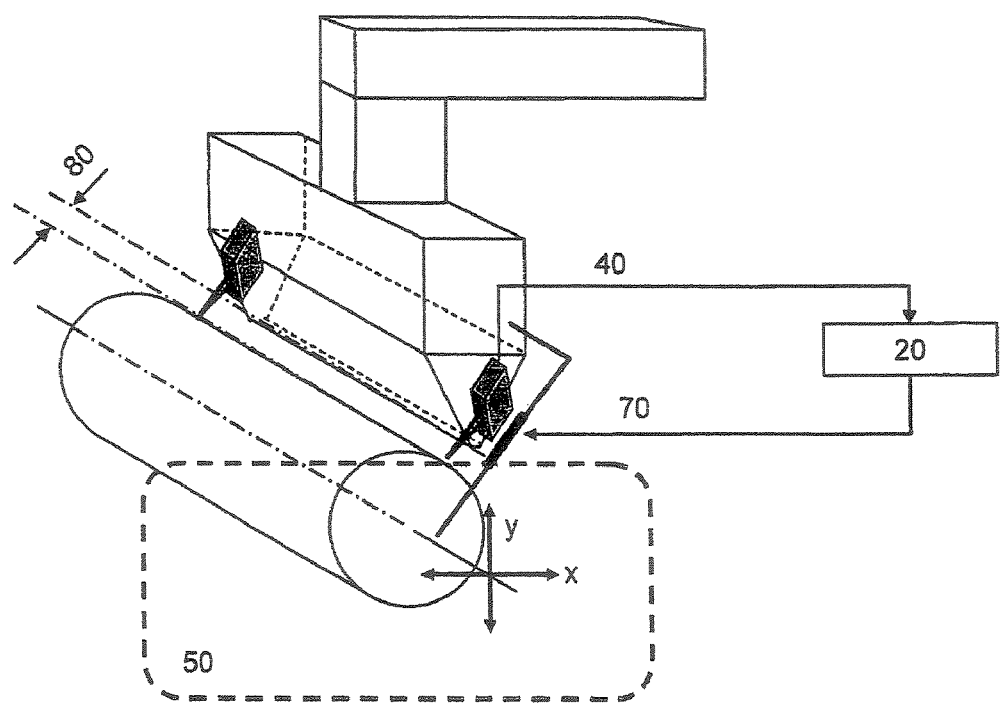
FIG. 1/3: Diagrammatic, oblique side view of an inventive extrusion system.
Figure 2:
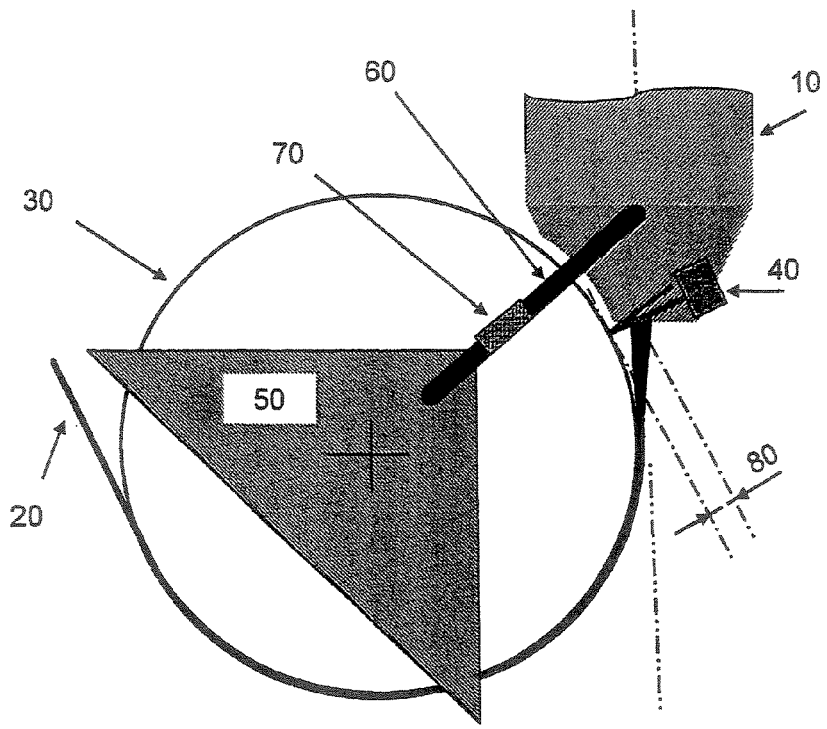
FIG. 2/3: Diagrammatic view of an inventive extrusion system from the side (perpendicularly to the direction of extrusion)
Figure 3:
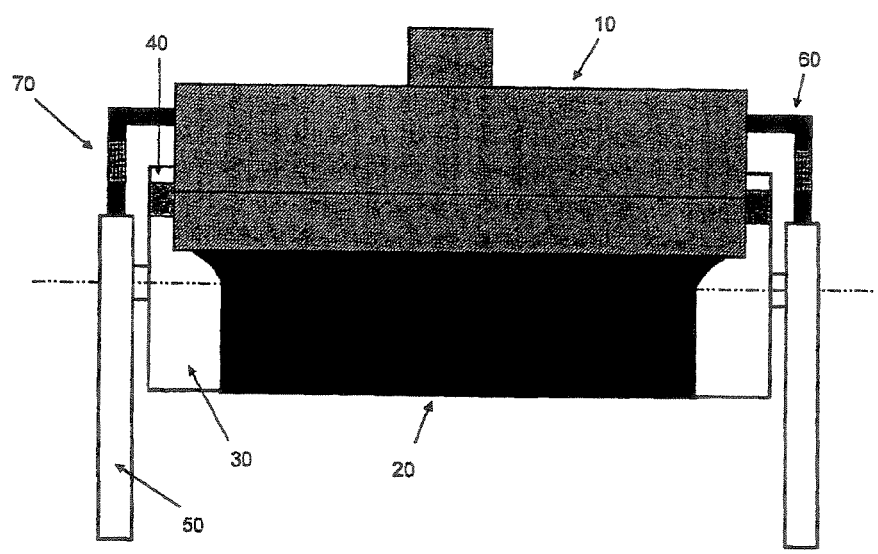
FIG. 3/3: Diagrammatic frontal view of an inventive extrusion system

| Key: | |
|---|---|
| 10 | Extrusion die |
| 20 | Melt film/foil |
| 30 | Chill roll |
| 40 | Distance measurement sensor |
| 50 | Roll frame |
| 60 | Rigid connection |
| 70 | Piezoactuator |
| 80 | Distance |
| 90 | Controller |

DETAILED DESCRIPTION OF THE INVENTION

Process

An important factor for the invention is the use of the long-known chill-roll melt-casting process (see by way of example EP 1 117 731 B1 or EP 1 285 742 A2). Here, a melt film emerging from an extrusion die is applied to a single cooling roll, the chill roll, and is cooled. The intention here is that the melt film particularly preferably be not stretched in the direction of extrusion, or be only very slightly stretched, by a factor of not more than 5, and that it be exposed to no active cooling before it impacts the chill roll. This has the advantage that very little molecular orientation occurs, and that the resultant foil has a high degree of optical isotropy. The chill-roll process differs in this respect in particular from the processes known as polishing-stack processes, in which the melt film passes through a nip formed by two opposite rolls.

Application of the melt film to the surface of the chill roll is, as in EP 1 117 731 B1, preferably substantially tangential, particularly preferably tangential. Tangential means that the melt film generally emerging vertically downwards from the extrusion die makes gentle contact or only just makes contact, at an angle which is ideally 0°, with the roll positioned on one side of the melt film, at the most adjacent position within its surface, without experiencing any prior deflection, and can then wrap around this roll. The angle here is formed by the vector of the main direction of flow of the melt and the direction of the tangent to the circular cross section of the roll at the point of impact of the melt. Substantially tangential in particular means non-radial, and means that at most a very small deflection of the melt film away from the ideal tangential contact is intended to be acceptable, by way of example to contact the roll at an angle of up to at most 20°. However, the latter is less preferred. Tangential application of the melt film to the cooled roll has the advantage of eliminating stretching or deformation effects which could adversely affect the quality of the product, or at least keeping these to a very low level.

Between exit from the extrusion die and the point of application to the cooled roll (chill roll), the melt film traverses a distance or path. Across the width of the extrusion die and of the cooled roll the intention is naturally that this distance be everywhere almost constant (in the stationary condition), in order to avoid stretching across the width of the melt web. The general intention is that the distance in the direction of extrusion be minimized. It is preferable that the distance between the point of discharge of the melt from the extrusion die and the point of application to the chill roll be in the range from 5 to 500 mm, preferably in the range from 10 to 250 mm, in particular in the range from 15 to 150 mm, in the stationary condition. In the operating condition, the distances undergo variation due to oscillation in the region of a few μm, as stated at a later stage below.

The intention here is that the melt film particularly preferably be not stretched in the direction of extrusion, or be only very slightly stretched, by a factor of not more than 5, and that it be exposed to no active cooling before it impacts, or is applied to, the chill roll. This has the advantage that very little molecular orientation occurs, and that the resultant foil has a high degree of optical isotropy. The chill-roll process differs in this respect in particular from the processes known as polishing-stack processes, in which the melt film passes through a nip formed by two opposite rolls.

The invention provides a process for production of the inventive foil.

The thermoplastic is melted in an extrusion system with an extruder, with a melt pump and with an extrusion die with a discharge orifice in the form of a slot, and is conveyed onward and, in the form of a sheet-like melt web, is discharged from the discharge orifice of the extrusion die.

There is preferably a melt filter provided, retaining contamination, between the melt pump and the extrusion die. The mesh width of the filter insert can by way of example be from 5 to 50 μm, preferably by way of example from 10 to 30 μm.

The extrusion die can moreover be equipped in a manner known per se with a profile-die system in the region of the die exit. The profile-die system serves for fine control of the melt profile as it emerges, by appropriately modifying the shape of a discharge region designed with thin walls by exerting pressure from adjusters, e.g. studs, thermal expanders or piezotranslators. An example of a suitable design of the die outlet region takes the form of a flexible lip or takes the form of what may be called a "superflex lip" (see by way of example EP-A 367 022) or takes the form of a membrane (see Groβ et al. Kunststoffe 84 (1994), 10, pp. 1352-1358).

The melt web is applied to a single cooled roll, known as a chill roll, and is cooled. The temperature of the chill roll here can by way of example be from 100 to 200° C., e.g. from 100 to 130° C. or from 110 to 120° C.

Avoidance of Transfer of Oscillations

A serious disadvantage in contrast to the advantages of the chill-roll process in production of a foil with a low degree of orientation is that the achievable thickness tolerances both in the direction of extrusion and perpendicularly to the direction of extrusion are markedly poorer than in polishing-stack processes. In polishing-stack processes, a small melt cushion forms in the process upstream of the nip. This cushion and the pressure in the nip lead to equalization of the thickness of the foil in all directions.

The consequence of this principle is that the thickness tolerances achievable in the chill-roll process are therefore usually substantially poorer.

A discovery underlying the invention is that oscillations can be transferred to the extrusion die from the region of the extruder and in particular the melt pump. In the operating condition, these oscillations lead to varying distances between the discharge orifice of the extrusion die and the chill roll. The varying distances in turn lead to compression or extension of the melt web, and this in turn leads to an increase in thickness tolerances.

Another discovery underlying the invention is that any lack of balance of the chill roll contributes to variation in distances between the discharge orifice of the extrusion die and the chill roll. The varying distances in turn lead to compression or extension of the melt web, and this in turn leads to an increase in thickness tolerances.

It is therefore preferable to use an extrusion system in which the distance between the discharge orifice of the extrusion die and the cooled roll (chill roll) varies as a function of time, or alters, by not more than +/−50 μm, particularly preferably by not more than +/−25 μm, particularly preferably by not more than +/−10 μm in the operating condition.

An example of a method of achieving this uses a cooled roll (chill roll) whose rotation tolerance is +/−10 μm or below, preferably +/−5 μm or below. This measure can reduce the oscillations to a range of +/−25 μm or less. Surprisingly, the reduction in the level of the oscillations leads to reduced thickness tolerances and especially to a step improvement in surface quality of the resultant foils to a range of laser deflections smaller than or equal to 0.8 angular minutes, preferably smaller than or equal to 0.5 angular minutes.

Coolable rolls (chill rolls) suitable for the purposes of the invention with rotation tolerance of +/−10 μm or below, preferably of +/−5 μm or below, can be manufactured with this level of precision and are available from producers of parts for extrusion systems. The stated rotation tolerance is based on the installed condition or operating condition. The roll therefore not only has to have been manufactured with precision but also has to have been positioned and centred with high precision within the extrusion system.

The, or a, distance (in the operating condition), or the minimum or shortest distance (in the stationary condition) between the discharge orifice of the extrusion die and a point on the surface of the cooled roll can by way of example be determined by means of optical measurement sensors or via laser path measurement practically between any desired selected measurement points. It is preferable to select measurement points closely adjacent to the discharge orifice of the extrusion die and then, on the roll surface, to select a measurement point which gives the shortest measured path in the stationary condition. The important factor here is not the distance itself but the variation of the distance as a function of time in the operating condition. The distance is advantageously measured via two distance sensors unaffected by temperature respectively positioned on the right- and left-hand side adjacent to the discharge orifice of the extrusion die, preferably in such a way that they can then record the respective shortest distance or the shortest distances (in the stationary condition) to the surface of the cooled roll. The variation in this or these distances is then recorded in the operating condition. The values from the two measurement sensors can then be computer-averaged. The values thus determined correspond to the alteration in the average distance between the discharge orifice of the extrusion die and the cooled roll (chill roll) in the operating condition.

Restriction of the variation or alteration of the average distance between the extrusion-die discharge orifice and the cooled roll (chill roll) as a function of time in the operating condition can be achieved in various ways.

In another possible technical measure, the roll frame which holds the cooled roll (chill roll) has solid connection to one or more points, e.g. by way of struts, e.g. composed of steel, to the extrusion die, e.g. via screw threads or rivets. This simple measure in itself markedly reduces the level of oscillations adversely affecting the average distance between the extrusion-die discharge orifice and the cooled roll.

A more advanced possible technical measure connects the roll frame which holds the cooled roll (chill roll) to the extrusion die by way of at least two actuators, the actuators being controlled by way of a control circuit, so that they actively counteract changes in distance between the discharge orifice of the extrusion die and the cooled roll. This measure gives a still further reduction in the level of oscillations adversely affecting the average distance between the discharge orifice of the extrusion die and the cooled roll. The actuators, e.g. piezoactuators, can by way of example be installed on the right- and left-hand side adjacent to the roll and, at points on the right-hand and left-hand side of the discharge orifice of the extrusion die, can be connected thereto. It is also possible, if appropriate, to attach additional solid struts between the roll frame and the extrusion die.

The technical measures mentioned can be used individually or preferably in combination.

Melt Pump

A certain additional effect can be achieved if the extrusion system has a melt pump between the extruder and the extrusion die, but this effect is less extensive than the measures described above. The melt pump brings about a leveling of the otherwise varying melt pressure from the extruder into the extrusion die, and thus likewise contributes to reduction of transfer of oscillations.

The extrusion system used is preferably one in which the melt pump has been decoupled from the extrusion die in order to eliminate transfer of oscillations. The method of decoupling can be mechanical, e.g. by way of flexible, high-temperature-resistant lines for the melt.

Reduction or elimination of transfer of oscillations from the melt pump to the extrusion die has the advantage that foils can be obtained with further reduced thickness tolerances and with improved surface quality.

Radius for the Edges of Discharge Orifice of Extrusion Die

Another feature which in a preferred embodiment can contribute to very small thickness tolerances for the inventive foils is a radius of at most 50 μm for the edges of the discharge orifice of the extrusion die, preferably at most or smaller than 30 μm, particularly at most or smaller than 25 μm. The radii of the edges of the discharge orifice of the extrusion die preferably have non-uniformity of at most or smaller than +/−5% across the width of the discharge orifice. The comparatively sharp and very uniform edges probably lead to particularly good release of the melt web, helping to obtain foils with very small thickness tolerances. The angle of the edge or of both edges of the discharge orifice is preferably from 45 to 100°, usually 90°.

The roughness of the inner surface of the die lip region can affect the surface quality of the foils produced. The inner surface of the die lip region is the region behind the manifold and behind any mid-flow baffle present. The inner surface of the die lip region extends, as a function of the design of the extrusion die, from about 0.5 to 5 cm, measured from the discharge orifice, into the interior of the extrusion die. The roughness depths of the inner surface of the die lip region are preferably intended to be $R_a$ to DIN 4768 from 0.01 μm to 0.002 μm or below, $R_z$ from 0.08 μm to 0.015 pin and $R_{max}$ from 0.10 μm to 0.025 μm.

Friction-Reducing Coatings

The inner surface of the die lip region of the extrusion die has preferably been equipped with a friction-reducing coating. This has the advantage of increasing process reliability, in particular in long-term operation. After prolonged operation of the extrusion system, e.g. after from 20 to 60 hours of continuous operation, undesired deposits can form in the die lip region and can be the cause of die lines on the surface of the foil. Die lines on the foil can in some instances be visible. Another term used then is extrusion streaks. However, a particular problem is provided by very fine die streaks which are not discernible to the naked eye. The foil then initially appears to be completely optically satisfactory. However, when these foils are used for production of optical data carriers the defective areas can cause defects in read-off of the data. The level of die lines can be decisively reduced or indeed reduced to zero if the inner surface of the die lip region of the extrusion die is equipped with a friction-reducing coating. To avoid impairing the elasticity of the die lip region, the coating is not to be excessively thick. Coatings whose total thickness is in the region from 3 to 30 μm, preferably from 5 to 20 μm, are advantageous.

The lip region of the die is preferably subdivided into separable elements, thus permitting better accessibility during operations on the inner surface.

The preferred roughness depth range can be achieved via polishing or via coating of the inner surface of the die lip region. According to EP 1 117 731 B1, the inner surface of the die lip region can by way of example be chromed, and the chromed surface can also be polished.

The coating can preferably be composed of Ni, CrN, TiCN, TiC, TiAlN, DLC (diamond-like carbon) or of another diamond-like carbon coating. When they are compared with the chromium coating described in EP 1 117 731 B1, these coatings have the advantage of operating times up to ten times longer. Appropriate coatings and their application to steel surfaces are in principle known to the person skilled in the art, e.g. from U.S. Pat. No. 5,476,134 or U.S. Pat. No. 4,637,477.

An example of a suitable process for applying an appropriate coating to the inner surface of the die lip region is the "physical vapour deposition" process (PVD process, see by way of example U.S. Pat. No. 5,476,134 or U.S. Pat. No. 4,637,477). The coating can be a single-layer or preferably a multilayer coating. In the case of the multilayer coating, a hard layer, e.g. a nickel layer of thickness from 10 to 20 μm, can preferably first be applied to the comparatively soft steel or steel alloy of the extrusion die, and this can then be coated with a still harder layer, e.g. with a layer of thickness from 2 to 5 μm composed of TiN, CrN or DLC. A multilayer coating on the inner surface of the die lip region with an inner nickel layer and, applied thereto, a layer composed of TiN, CrN or DLC is particularly advantageous for extrusion of foils composed of polycarbonate.

If the thermoplastic selected is polyethylene terephthalate, a tungsten carbide coating is particularly preferred as friction-reducing coating for the inner surface of the die lip region, and can be applied by the plasma coating method.

The inner surface of the extrusion die in the extrusion die lip region can have been metallurgically or chemically modified or doped.

The inner surface of the extrusion die in the extrusion die lip region can have been provided with a single- or multilayer coating composed of a fluorine compound.

Heating of the Emerging Melt Film

It is preferable that the melt web is heated between the exit from the extrusion die and the point of application to the chill roll. This has the advantage of reducing the occurrence of internal molecular stresses. It is advantageous to heat the melt web in such a way that, at the point of application to the chill roll or shortly before that point its temperature is above the glass transition temperature of the extruded plastic by at least 30° C., at least 40° C., at least 50° C., at least 60° C. or at least 80° C.

The glass transition temperature here is in particular the midpoint temperature $T_{mg}$ to ISO 11357-2, 3.3.3. The measurement is made without adding plasticizer, with residue monomer contents (REMOs) of less than 100 ppm, with a heating rate of 10° C./min, and under nitrogen.

Housing and Inert Gas Atmosphere

The extrusion system used is preferably one in which the housing surrounds the melt web between the exit from the extrusion die and the point of application to the chill roll. This firstly permits effective heating of the melt web, and at the same time it provides the possibility of using an inert gas, e.g. nitrogen, to surround the melt web between the exit from the extrusion die and the point of application to the chill roll. The latter has the advantage that the level of oxidation processes within the plastics material which can lead to undesired discolouration or haze is reduced, or is reduced to zero.

Foil

The invention provides a foil, in particular an extruded foil, composed of a thermoplastic, preferably of a transparent thermoplastic, whose thickness is from 10 to 150 μm, preferably from 20 to 120 μm, in particular from 30 to 100 μm.

In-Plane Birefringence

The in-plane birefringence of the foil is calculated from the optical path difference. The optical path difference due to the birefringence of a light beam incident perpendicularly with respect to the surface of the foil can be determined by way of example by using the polarization microscopy (polarimeter) principle. The person skilled in the art is familiar with the methods for determining in-plane birefringence (see by way of example ISO 11455).

The foil has birefringence (in-plane birefringence) which causes an optical path difference of at most 25 nm, in particular at most 20 nm, preferably at most 15 nm, preferably at most 12 nm, in particular at most 10 nm, or at most 5 nm, when radiation passes through the material perpendicularly. By way of example, in-plane birefringence can amount to from 2 to 10 nm or from 2 to 5 nm. Foils with these values are termed optically and mechanically isotropic or almost isotropic and are suitable for optical applications with stringent requirements.

Vertical Birefringence

One of the ways in which an inventive extruded foil differs from cast foils (see by way of example EP 351 886) is via markedly smaller vertical birefringence (in which connection see by way of example EP 1 202 261 A1). The vertical birefringence of the inventive foil is at most 0.0004, preferably at most 0.0003. An example of a suitable test method for determining the vertical birefringence is described in detail in EP 1 202 261 A1, p. 11, line 44-p. 12, line 24. The principle is unlike that of in-plane birefringence measurement, being based on an incident light angle of 45°. The person skilled in the art is familiar with methods for determination of vertical birefringence.

A low vertical birefringence value is particularly advantageous if the inventive foil is used in optical data carriers. The higher the numeric aperture of the laser optics or read-off from the data carrier, the greater the proportion of obliquely incident laser radiation. In particular in the case of optics with high numeric aperture, the signal/noise ratio becomes poorer as vertical birefringence increases.

Surface Quality

Surprisingly, there is no region of the surface of the foil, based on a circular area whose diameter is 12 cm, preferably based on an area of 1 m$^2$, particularly preferably based on an area of 10 m$^2$, that deflects a perpendicularly incident light beam by more than 0.8, preferably 0.5, angular minutes.

In particular, there is no region of the surface of the foil, based on a circular area whose diameter is 12 cm, that deflects a perpendicularly incident light beam by more than 0.6 or more than 0.5 angular minutes.

The method of measurement consists in recording the deflection angle experienced by a laser beam passing through the foil. The method known as laser deflection is used here. Across the entire extrusion width, a stepping motor is used to operate a displacement table which measures the angular deviation experienced by a laser beam on passing perpendicularly through the foil. In order to verify the surface quality of the foil demanded by the invention, it is possible to test stamped-out pieces having a circular area whose diameter is 12 cm or sections or cut-outs from the foil web of respectively 1 or 10 m$^2$.

An example of a method for measuring the surface quality of the foil measures the angular deviation experienced by a laser beam at 632.8 nm on perpendicular passage through the foil, perpendicularly to the direction of extrusion, across the entire extrusion width. A displacement table operated by a stepping motor can be used for this task. The diameter of the laser beam used here can preferably be smaller than, or at most about the same as, the size of the defects to be detected, e.g. die lines or extrusion streaks. This is practically always the case with commercially available laser equipment. The transmitted beam then passes through a telescope in order to increase the deflection angle, and is incident on a digital optical sensor which is sensitive to position and intensity. This sensor determines the location of the centre, and/or the intensity, of the luminous spot incident thereon, and gives this as output in x and y coordinates by way of a serial interface. Only the y component here is relevant for evaluation of die lines.

Thickness Tolerance

In particular, the thickness tolerance of the foil, or its differences in thickness, based on a circular area whose diameter is 12 cm, is not more than +/−1%, preferably not more than 0.5%. The percentage deviation here is based on the average of the maximum and the minimum thickness value within the circular area whose diameter is 12 cm. This specification ensures that the foil is suitable by way of example for production of optical data storage with high storage density of by way of example 25 gigabytes (GB) or more. Based on a foil of thickness 100 μm, the thickness deviation from the average is therefore not more than +/−1 μm within a circular area whose diameter is 12 cm.

The thickness tolerance can be determined via interferometric layer thickness measurement, which is known to the person skilled in the art.

An example of a possible method for interferometric layer thickness measurement uses an achromatic measuring head. The layer thickness measurement method is based on superposition of the light reflected at both surfaces of the foil. Given a known refractive index of the material, the layer thickness can be determined from the spectrum of refracted light.

Plastics

The foil is composed of a thermoplastic, preferably of transparent thermoplastic. The luminous transmittance of the foil for daylight (D65 standard illuminate), $\tau_{D65}$, see by way of example DIN 5033/5036, is preferably in the range of not less than 60%, preferably from 65 to 92%.

The foil can be composed by way of example of polymethyl methacrylate plastic, impact-modified polymethyl methacrylate, polycarbonate plastic, polystyrene plastic, styrene-acrylonitrile plastic, polyethylene terephthalate plastic, glycol-modified polyethylene terephthalate plastic, polyvinyl chloride plastic, polyolefin plastic, cycloolefinic copolymers (COCs), PPS plastic or PPSU plastic, acrylonitrile-butadiene-styrene (ABS) plastic or a mixture (blend) of various thermoplastics.

The foil is preferably composed of a linear or branched polycarbonate whose average molecular weight Mw (weight average) is from 10 000 to 45 000, preferably from 12,000 to 25,000, particularly preferably from 15,000 to 20,000.

The molecular weight Mw (weight average) can by way of example be determined by gel permeation chromatography or by a light scattering method (see by way of example H. F. Mark et al., Encyclopedia of Polymer Science and Engineering, 2nd Edition, Vol. 10, pp. 1 et seq., J. Wiley, 1989).

Uses

The inventive foil can by way of example be used for construction of transparent layers in optical data carriers, as a protective covering foil for optical data carriers, as protective covering foil for scratch protection for optical data carriers, as carrier material for the information layer of optical data carriers or as functional foil in liquid crystal display screens.

EXAMPLES

Inventive Example 1

Production of an inventive foil via chill-roll extrusion of a polycarbonate moulding composition whose average molecular weight Mw (weight average) is about 20 000 (daltons).

The extrusion system is composed of a single-screw extruder, a melt pump, and a slot extrusion die with a 680 mm×0.4 mm discharge orifice. The slot extrusion die has superflex lip design (see EP-A 367 022).

The inner surface of the extrusion die in the lip region has been polished, thus achieving roughness Ra of 0.002 μm, Rz of 0.015 μm and Rmax of 0.025 μm. The inner surface of the extrusion die is provided with a duplex coating of 15 μm of nickel and 5 μm of CrN.

The radius of the die lip in the discharge region is from about 100 to 200 μm, and its radius uniformity across the width is +/−50 μm.

A chill roll has been positioned centrally at a distance of 25 mm from the discharge orifice of the slot extrusion die. The diameter of the roll is 400 mm and its width is 700 mm The roll surface has roughness Ra<=0.003 µm, and Rmax<0.25 µm measured to DIN 4768. The rotation tolerance of the roll is <=3 µm.

The extrusion die has solid connection to the roll frame at two points on the right- and left-hand side of the discharge orifice of the extrusion die, by way of profiled steel girders whose cross section is 5 cm×1 cm.

The temperature of the chill roll is set at from 100° C. to 130° C., preferably from 110° C. to 120° C.

The temperature of the melt stream is about 240° C. The melt film makes approximately tangential contact with the roll surface and wraps around the roll to the extent of about 180°.

The section between discharge of the melt from the die and the point of contact with the chill roll has been enclosed by a housing, and the internal temperature is about 120° C. This housing can be heated or charged with an inert gas atmosphere, e.g. with heated and filtered nitrogen (cleanroom class 100).

After wrapping around further rolls, the thickness of the foil web is determined via a contactless measurement system arranged so as to carry out traverses, and melt distribution in the die is controlled across the width by means of electronically processable information and a thermal expander system.

Comparative Example 1

Comparative Example 1 differs from Inventive Example 1 in that there is no solid connection between the roll frame and the extrusion die.

Inventive Example 2

Inventive Example 2 differs from Inventive Example 1 in that the extrusion die has connection to the roll frame at two points on the right-hand and left-hand side of the discharge orifice of the extrusion die, by way of piezoactuators. The piezoactuators are controlled by way of a control circuit integrated into the optical distance measurement system, and actively counteract changes in distance between the extrusion-die discharge orifice and the cooled roll (chill roll).

Inventive Example 3

Inventive Example 3 differs from Inventive Example 2 in that the radius of the die lip in the discharge region is about 25 µm, its radius uniformity across the width being +/−1 µm (sharp edge).

The relevant variables for the foils obtained in Comparative Example 1 and in Inventive Examples 1-3 are determined using stamped-out circular sections whose diameter is 12 cm, and are collated in the table below.

| | Comparative Example 1 | Inventive Example 1 | Inventive Example 2 | Inventive Example 3 |
|---|---|---|---|---|
| Solid connection between die and casting roll | − | + | + | + |
| Solid connection + actuators | − | − | + | + |
| Sharp edge | − | − | − | + |
| Foil thickness [average value in µm] | 90 | 90 | 90 | 90 |
| Oscillations between die and casting roll [+− µm] | 60 | 24 | 5 | 4 |
| Optical path difference (in-plane) [average value in nm] | 12 | 9 | 8 | 10 |
| Laser deflection [angular minutes] | 0.9 | 0.5 | 0.5 | 0.4 |
| Thickness tolerance Ø 12 cm [%] | 2 | 0.9 | 0.5 | 0.3 |
| Vertical birefringence | 0.0003 | 0.0003 | 0.00029 | 0.00025 |

(− without, + with)

The invention claimed is:

1. A process for production of a foil, comprising:
   (A) melting a thermoplastic in an extrusion system to obtain a melt, the extrusion system comprising
      an extruder,
      an extrusion die with a discharge orifice in the form of a slot, and
      a cooled roll (chill roll) secured moveably to a roll frame;
   (B) conveying the melt onward through the discharge orifice of the extrusion die, to yield a melt web in the form of a sheet; and
   (C) applying the melt web to the cooled roll (chill roll) and thereby cooling the melt web, to obtain the foil,
   wherein the foil comprises the thermoplastic,
   wherein a distance between the discharge orifice of the extrusion die and the surface of the cooled roll (chill roll) varies by not more than +/−50 µm as a function of time in operating condition,
   wherein the roll frame has a direct, solid connection, which is moveable, to the extrusion die, and the connection comprises at least two actuators situated between the roll frame and the extrusion die, and
   wherein the actuators are situated completely between the roll frame and the extrusion die.

2. The process according to claim 1, wherein a rotation tolerance of the cooled roll (chill roll) is +/−10 µm or less.

3. The process according to claim 1, wherein the actuators are controlled by a control circuit so that they actively counteract changes in the distance between the discharge orifice of the extrusion die and the cooled roll (chill roll).

4. The process according to claim 1, wherein a radius of edges of the discharge orifice of the extrusion die is at most 50 µm, with non-uniformity of not more than +/−5%.

5. The process according to claim 1, wherein the extrusion system comprises a melt pump between the extruder and the extrusion die.

6. The process according to claim 1, wherein an inner surface of a die lip region of the extrusion die comprises a friction-reducing coating.

7. The process according to claim 6, wherein the coating comprises a single- or multilayer, and optionally, modified coating comprising a Ni, CrN, TiCN, TiC, TiAlN, or DLC coating.

8. The process according to claim 6, wherein the inner surface of the extrusion die in the extrusion die lip region is metallurgically or chemically altered or doped.

9. The process according to claim 6, wherein the inner surface of the extrusion die in the extrusion die lip region comprises a single- or multilayer coating comprising a fluorine compound.

10. The process according to claim 1, wherein the melt web is heated on its way from an exit from the extrusion die to a point of application to the cooled roll (chill roll).

11. The process according to claim 10, wherein the extrusion system has a housing that surrounds the melt web between the exit from the extrusion die and the point of application to the cooled roll (chill roll).

12. The process according to claim 11, wherein, in a path between discharge from the extrusion die and the point of application to the cooled roll (chill roll), the melt web is surrounded by an inert gas.

13. The process according to claim 6, wherein the inner surface of the die lip region has roughness depths $R_a$ to DIN 4768 of from 0.01 µm to 0.002 µm or below, $R_z$ of from 0.08 µm to 0.015 µm and $R_{max}$, from 0.10 µm to 0.025 µm.

14. The process according to claim 1, wherein the connection, between the extrusion die and the roll frame, comprises at least two struts.

15. The process according to claim 14, wherein at least two of the actuators are piezoactuators.

* * * * *